US012761431B1

(12) United States Patent
Mizrahi

(10) Patent No.: US 12,761,431 B1
(45) Date of Patent: Oct. 13, 2026

(54) PERIPHERAL COMPUTE NODE WITH NEAR-PACKAGE OPTICS INTERFACE FOR OPTICAL COMMUNICATION

(71) Applicant: Next Silicon Ltd, Givatayim (IL)

(72) Inventor: Yehuda Mizrahi, Kfar Yona (IL)

(73) Assignee: Next Silicon Ltd, Givatayim (IL)

( * ) Notice: Subject to any disclaimer, the term of this patent is extended or adjusted under 35 U.S.C. 154(b) by 0 days.

(21) Appl. No.: 19/342,579

(22) Filed: Sep. 28, 2025

(51) Int. Cl.
*G02B 6/42* (2006.01)
*G02B 6/43* (2006.01)

(52) U.S. Cl.
CPC ......... *G02B 6/4278* (2013.01); *G02B 6/4269* (2013.01); *G02B 6/428* (2013.01); *G02B 6/43* (2013.01)

(58) Field of Classification Search
CPC .... G02B 6/4269; G02B 6/4278; G02B 6/428; G02B 6/43
See application file for complete search history.

(56) References Cited

U.S. PATENT DOCUMENTS 9,345,169 B1 5/2016 Campbell et al.
10,044,078 B2 8/2018 Jung et al.
10,477,731 B1 11/2019 Fu et al.
10,542,640 B1 1/2020 Leigh et al.
10,952,354 B1 3/2021 Chen et al.
11,333,907 B2 * 5/2022 Nelson .................. H03F 1/3241
11,895,798 B2 * 2/2024 Winzer .................. H05K 1/141
2006/0002086 A1 1/2006 Tencketges et al.
2010/0277868 A1 11/2010 Beaupre
2011/0212355 A1 9/2011 Essinger et al.
2012/0212175 A1 8/2012 Sharaf et al.
2013/0025826 A1 1/2013 Sakamoto et al.
2014/0295228 A1 10/2014 Yan et al.
2015/0079442 A1 3/2015 Haussmann
2015/0318587 A1 11/2015 Kim et al.
2015/0341119 A1 * 11/2015 Fincato .................... H05K 3/30 398/139

(Continued)

FOREIGN PATENT DOCUMENTS

TW 202430951 A * 8/2024 ............... G02B 6/13

OTHER PUBLICATIONS

English Translation for TW-202430951-A, 15 pages (Year: 2024).*

(Continued)

*Primary Examiner* — Daniel Petkovsek

(57) ABSTRACT

A peripheral compute node addresses the challenge of extreme high-speed communication between accelerator modules in supercomputing systems where copper interconnects become inadequate at frequencies of 56G baud and above. The node comprises detachable accelerator and optical converter modules positioned with electrical trace lengths as short as 5 millimeters to minimize signal degradation. A two-part liquid cooling system enables independent thermal pressure application to different circuit board areas through mechanically isolated heat sinks connected by flexible tubes sharing common inlet and outlet connections. The architecture supports optical communication between accelerator modules on the same board, within the same rack, and across different racks, enabling distributed modules to function as unified supercomputers while providing field serviceability through pluggable component replacement.

19 Claims, 8 Drawing Sheets

200 - Electronic Circuit Substrate

(56) References Cited

U.S. PATENT DOCUMENTS

| | | | | |
|---|---|---|---|---|
| 2016/0183409 | A1 | 6/2016 | Zhou et al. | |
| 2020/0132946 | A1* | 4/2020 | Bchir | G02B 6/43 |
| 2021/0176896 | A1 | 6/2021 | Yang et al. | |
| 2021/0378147 | A1 | 12/2021 | Chehade et al. | |
| 2022/0248560 | A1 | 8/2022 | Zhou et al. | |
| 2022/0312637 | A1 | 9/2022 | Norton et al. | |
| 2022/0377940 | A1 | 11/2022 | Yang et al. | |
| 2022/0413216 | A1* | 12/2022 | Hosseini | G02B 6/43 |
| 2023/0139202 | A1 | 5/2023 | Zhou et al. | |
| 2023/0422389 | A1 | 12/2023 | Subrahmanyam et al. | |
| 2024/0097796 | A1* | 3/2024 | Winzer | H04B 10/503 |
| 2024/0172393 | A1* | 5/2024 | Ahuja | H05K 7/20772 |
| 2025/0125312 | A1* | 4/2025 | Kang | H10W 90/00 |
| 2025/0216706 | A1* | 7/2025 | Staffaroni | G02F 1/0113 |

OTHER PUBLICATIONS

Official Action Dated Apr. 21, 2025 From the Re. U.S. Appl. No. 19/058,176. (28 Pages).

Official Action Dated Jun. 30, 2025 From the Re. U.S. Appl. No. 19/216,235. (21 Pages).

* cited by examiner

200 - Electronic Circuit Substrate

PERIPHERAL COMPUTE NODE WITH NEAR-PACKAGE OPTICS INTERFACE FOR OPTICAL COMMUNICATION

FIELD AND BACKGROUND OF THE INVENTION

The present invention relates to high-performance computing systems requiring extreme high-speed interconnection between accelerator modules, and more specifically to peripheral compute nodes with integrated optical communication capabilities addressing the fundamental challenge of connecting acceleration modules across multiple physical scales in distributed computing architectures.

Modern artificial intelligence and high-performance computing workloads demand unprecedented computational power delivered through specialized accelerator modules such as graphics processing units, field-programmable gate arrays, and application-specific integrated circuits. These accelerators must communicate at extreme high speeds to function as unified supercomputing systems. Contemporary supercomputing architectures require high-speed connections between accelerator modules operating across three critical scales: between two chips mounted on the same circuit board, between modules within the same rack, and between modules distributed across different racks. The ultimate goal is to create seamless connectivity that enables multiple distributed accelerator modules to function as one integrated supercomputer, regardless of their physical separation.

Traditional copper-based electrical interconnects become fundamentally inadequate at the extreme data rates required by modern accelerator modules. At frequencies reaching 56G baud and beyond, copper traces suffer from severe signal integrity degradation due to insertion loss exceeding 10 dB over distances as short as 10-20 mm, electromagnetic interference susceptibility that increases exponentially with frequency, power consumption penalties that scale unfavorably with distance and data rate, and physical routing constraints that limit achievable connection densities. These limitations prevent copper interconnects from supporting the bandwidth and reliability requirements necessary for extreme high-speed accelerator communication.

Optical interconnects provide the fundamental solution to extreme high-speed communication between accelerator modules, offering bandwidth capabilities exceeding 100 Gbps per channel with minimal distance-related degradation, immunity to electromagnetic interference, dramatically reduced power consumption for inter-module communication, and the ability to maintain signal integrity across all three connection scales. However, integrating optical communication directly with high-performance accelerator modules presents significant technical challenges that existing solutions fail to adequately address.

SUMMARY OF THE INVENTION

According to some embodiments of the present invention, a peripheral compute node comprises an electronic circuit substrate with a high-performance computing accelerator module mounted thereon. The system includes an electrical-to-optical converter that is mechanically mounted on the electronic circuit substrate immediately adjacent to the high-performance computing accelerator module. This converter is configured to convert electrical signals originated from the high-performance computing accelerator module to optical signals, and to convert optical signals originated from at least one of a host compute node and another high-performance computing accelerator module of another peripheral compute node to electrical signals. A key feature is the near-package optics (NPO) interface comprising an intermediate conductive layer on the electronic circuit substrate that provides direct electrical connection between the accelerator and the electrical-to-optical converter.

Optionally, the high-performance computing accelerator module comprises a system-on-chip for enhanced integration and performance.

Optionally, the electrical-to-optical converter includes a pluggable optical communication module having at least one optical transmission component and/or at least one optical reception component, along with a socket structure having a detachable mounting interface configured to receive the optical transceiver module in removable engagement with the electronic circuit substrate.

Optionally, the system further includes a liquid cooling assembly configured to dissipate heat generated by both the accelerator and the electrical-to-optical converter during high-speed optical data transmission operations. This cooling assembly may include at least one heat sink thermally coupled to the electrical-to-optical converter, with the heat sink comprising an inner cavity fluidically connectable to a liquid coolant distribution unit and configured to form a liquid coolant circulation pathway. The inner cavity encompasses the electrical-to-optical converter such that liquid coolant flows in proximity to its surface to dissipate heat generated during optical transmission operations.

Optionally, the liquid cooling assembly utilizes at least one first heat sink thermally coupled to the electrical-to-optical converter and at least one second heat sink thermally coupled to the accelerator, with a flexible fluid connection fluidically connecting between the heat sinks. This arrangement provides thermal coupling to both components during high-speed optical data transmission operations without applying damaging mechanical stress.

Optionally, tightening elements are mounted to enable independent application of different thermal coupling pressures to the accelerator and the electrical-to-optical converter without mechanical stress transfer therebetween.

Optionally, the heat sink has a frame-shaped structure sized corresponding to dimensions of a peripheral area of the electronic circuit substrate, with the inner cavity formed within an inner perimeter of the frame-shaped structure and positioned to provide thermal coupling with the electrical-to-optical converter.

Optionally, the system includes a base member positioned adjacent to a bottom side of the electronic circuit substrate and mechanically isolated groups of tightening elements configured to independently press the at least one heat sink onto heat-dissipating areas of the accelerator and onto the electrical-to-optical converter.

Optionally, a plurality of inner channels are configured to distribute liquid coolant flow substantially evenly around the electrical-to-optical converter.

Optionally, the intermediate conductive layer comprises electrical traces having a path length of less than 50 millimeters between the accelerator and the electrical-to-optical converter, ensuring minimal signal latency and loss.

Optionally, both the high-performance computing accelerator module and the electrical-to-optical converter are implemented as detachable modules to enable independent field replacement of either component.

According to some embodiments of the present invention, a multiprocessor compute cluster comprises a plurality of peripheral compute nodes as described above, wherein each peripheral compute node is communicatively coupled with a host compute node to enable distributed computing operations. Importantly, communication between the plurality of peripheral compute nodes enables direct peer-to-peer data transmission without routing through the host compute node.

Optionally, the plurality of peripheral compute nodes are configured to execute parallel computational tasks while maintaining data coherency through the optical communication links.

According to some embodiments of the present invention, an alternative multiprocessor compute cluster comprises a host compute node and a plurality of peripheral compute nodes. Each peripheral compute node includes an electronic circuit substrate, a high-performance computing accelerator module mounted on the substrate and communicatively coupled with the host compute node, an electrical-to-optical converter mechanically mounted on the substrate, and a near-package optics interface with an intermediate conductive layer providing direct electrical connection between the accelerator module and the electrical-to-optical converter. The plurality of peripheral compute nodes are configured for direct peer-to-peer optical communication to enable distributed computing operations without routing through the host compute node.

Optionally, the plurality of peripheral compute nodes are configured to execute parallel computational tasks while maintaining data coherency through the optical communication links.

According to some embodiments of the present invention, a method of transmitting data between high-performance computing accelerator modules in a distributed computing system involves generating electrical data signals at a first high-performance computing accelerator module during computational processing operations, then transmitting these signals through an intermediate conductive layer having electrical traces with path lengths of less than 50 millimeters to a first electrical-to-optical converter positioned immediately adjacent to the first accelerator module. The method continues by converting the electrical data signals to optical data signals, transmitting the optical data signals directly to a second electrical-to-optical converter, converting the optical signals back to electrical signals, transmitting the converted electrical signals through a second intermediate conductive layer to a second accelerator module, and processing the electrical data signals at the second accelerator module to continue distributed computational operations.

Optionally, the optical data signals are transferred over optical communication links comprising fiber optic cables connecting between optical transceivers of the electrical-to-optical converters.

Optionally, the method further comprises operating cooling assemblies thermally coupled to the accelerator modules and electrical-to-optical converters based on thermal loads generated during the distributed computing operations.

This disclosure herein also describes a comprehensive system for high-performance distributed computing that leverages near-package optical communication to achieve low-latency, high-bandwidth data transmission between computing accelerators while addressing thermal management challenges inherent in such high-performance systems. Retry Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
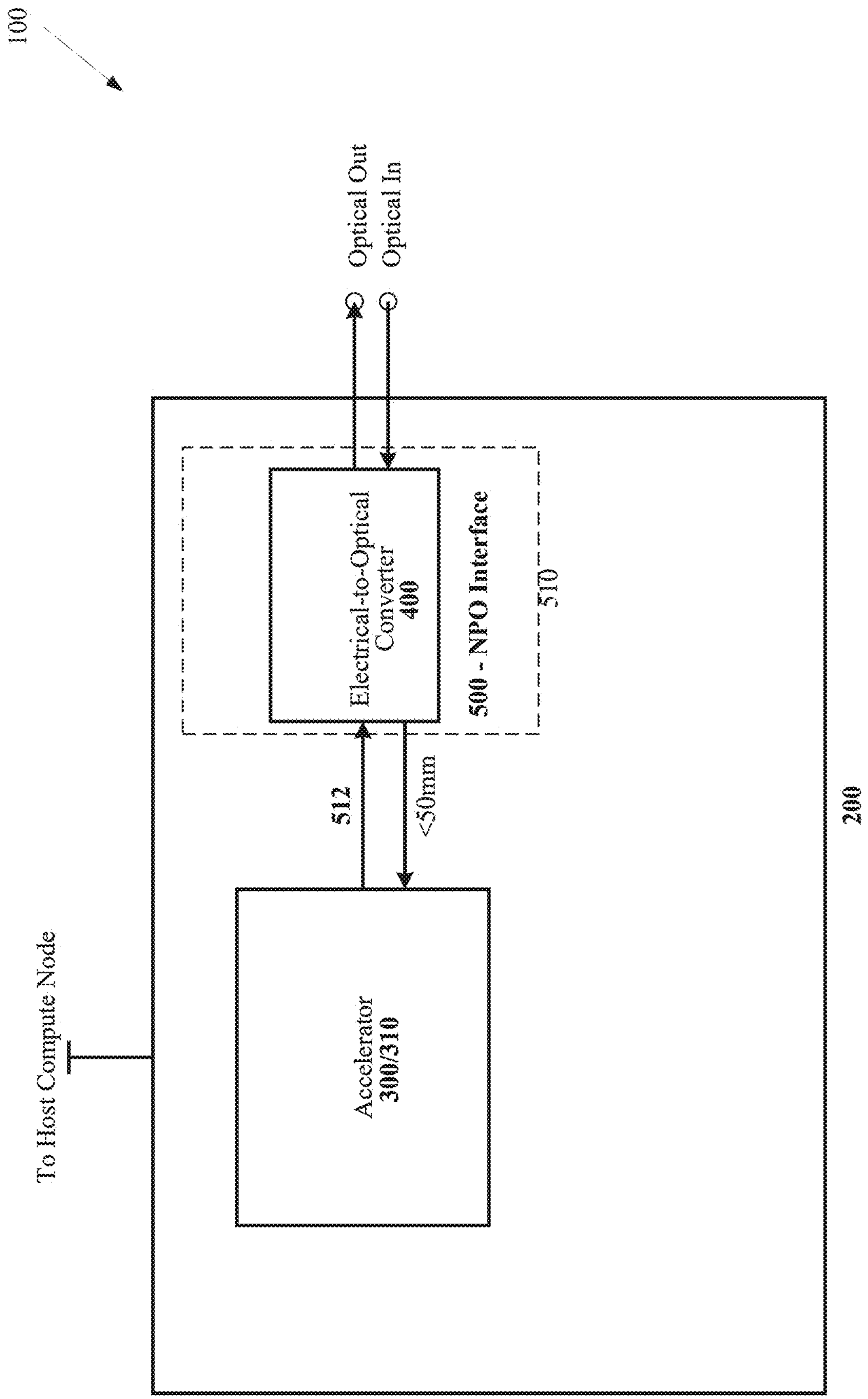
FIG. 1 is a schematic illustration of a peripheral compute node showing a system-on-chip implementation with optimized electrical path length between the accelerator module and electrical-to-optical converter, according to some embodiments of the present invention.

The present invention relates to the field of high-performance computing systems, and more specifically to peripheral compute nodes with integrated optical communication capabilities for distributed computing architectures. The invention particularly concerns the thermal management and optical interconnection of high-performance computing accelerator modules in systems requiring high-speed inter-node communication.

As described in the background section, to address the limitations of electrical interconnects, optical communication solutions are used. However, the integration of optical components with high-performance computing systems presents its own set of challenges. Traditional optical transceivers are typically housed in separate modules or cards, connected to the main processing elements through electrical pathways. This approach introduces additional conversion steps and electrical routing that can negate some of the benefits of optical communication.

The integration of optical components near high-performance accelerators compounds the thermal management challenge. Optical transceivers, particularly those based on semiconductor lasers and photodetectors, are sensitive to temperature variations. Excessive heat can degrade optical component performance, reduce lifetime, and introduce signal quality issues.

Traditional cooling approaches often treat optical and electronic components separately, leading to complex cooling architectures with multiple independent cooling loops or systems. This approach increases system complexity, cost, and potential failure modes while potentially leaving some components inadequately cooled.

The concept of near-package optics (NPO) has emerged as a potential solution to minimize the electrical pathway between high-speed processors and optical transceivers. By positioning optical conversion components in close proximity to the processing elements, NPO approaches can reduce electrical signal degradation and improve overall system performance.

Current approaches to integrating optical communication capabilities with high-performance accelerator modules suffer from several limitations. Electrical routing between accelerators and optical transceivers introduces signal degradation and power consumption penalties. Thermal management solutions often fail to adequately address the combined thermal loads of both electronic and optical components in close proximity configurations.

Furthermore, existing solutions typically lack the flexibility to accommodate manufacturing tolerances and thermal expansion differences between components, potentially leading to mechanical stress and reliability issues. The mechanical isolation of different system components, while maintaining effective thermal coupling, represents a significant engineering challenge in current implementations.

There exists a need for a comprehensive solution that addresses the integration of optical transceivers in close proximity to high-performance accelerator modules while providing effective thermal management for both electronic and optical components. Such a solution should minimize electrical signal paths, provide mechanical flexibility to accommodate manufacturing tolerances, and ensure reliable operation under the demanding thermal conditions present in high-performance computing environments.

Embodiments of the present invention addresses these challenges by providing a peripheral compute node architecture that integrates electrical-to-optical conversion capabilities immediately adjacent to high-performance computing accelerator modules, coupled with an advanced liquid cooling system capable of managing the thermal loads of both electronic and optical components while accommodating mechanical tolerances and maintaining system reliability.

Embodiments of the present invention provide a peripheral compute node architecture that reimagines how high-performance accelerator modules communicate with each other in distributed computing environments by integrating electrical-to-optical conversion capabilities directly adjacent to high-performance computing accelerator modules.

The peripheral compute node represents a departure from traditional computing architectures where optical transceivers are housed separately from processing elements. Instead of routing electrical signals across significant distances before optical conversion, embodiments of the invention position the electrical-to-optical converter immediately adjacent to the accelerator module, for example within the peripheral area of the accelerator module. This proximity creates what can be understood as a "near-packaged" solution where computation and optical communication functions operate as an integrated system.

Some embodiments of the present invention implement a modular approach where one or more of the accelerator module and the optical connector are implemented as detachable, pluggable components. This modularity addresses the economic reality that accelerator modules represent substantial capital investments, often costing thousands of dollars per unit. The pluggable architecture enables replacement of individual components without discarding entire circuit boards or rack assemblies, technology upgrades as accelerator and optical transceiver standards evolve, field serviceability that minimizes system downtime during maintenance operations, and cost-effective scaling of computational resources through selective component upgrades. In other embodiments the accelerator module and/or the optical connector are implemented as monolithic components.

Embodiments of the present invention incorporate a two-part cooling system that enables independent thermal pressure application to different areas of the circuit board. This approach addresses the challenge of applying optimal thermal coupling pressure to both accelerator modules and optical transceivers without risking mechanical damage to sensitive components. The cooling system features mechanically isolated heat sinks that can be pressed against their respective components with independently optimized pressure levels, flexible tube connections between cooling elements that accommodate differential thermal expansion and manufacturing tolerances, shared inlet and outlet connections to a common liquid coolant distribution unit that minimize space requirements and system complexity, and thermal isolation barriers that prevent heat transfer between high-power accelerators and temperature-sensitive optical components. The cooling rate and/or liquid pressure may be fixed and/or adapted to provide optimized cooling, for example based on measured or estimated computation consumption and/or heating.

Embodiments of the present invention teaches how several interconnected components work together to achieve high-performance distributed computing with optical interconnection capabilities. The electronic circuit substrate, for example a PCB, serves as the foundation, providing both mechanical support and electrical pathways for the various components. Mounted on this substrate is the high-performance computing accelerator module, which may be implemented as a system-on-chip or other advanced processing element capable of intensive computational tasks. This accelerator represents the computational heart of the peripheral node, designed to handle specialized workloads such as artificial intelligence processing, scientific computing, or other demanding applications.

The electrical-to-optical converter constitutes the communication interface of the system. This component performs a function of converting electrical signals originated from the high-performance computing accelerator module into optical signals for transmission to other compute nodes such as a host computing device and/or other peripheral compute nodes. Simultaneously, it converts incoming optical signals from other nodes back into electrical signals that the local accelerator can process. This bidirectional conversion capability enables seamless optical networking with and optionally between distributed compute nodes.

The near-package optics comprises an intermediate conductive layer on the electronic circuit substrate that provides direct electrical connection between the accelerator and the electrical-to-optical converter. The directness of this connection minimizes signal degradation and maximizes the benefits of the co-located architecture.

Understanding that the close proximity of heat-generating accelerator modules and temperature-sensitive optical components creates thermal management challenges, the embodiments of the present invention incorporate liquid cooling capabilities. The liquid cooling assembly addresses the thermal loads of both electronic and optical components through an integrated approach that maintains optimal operating temperatures while accommodating mechanical tolerances between components.

The cooling system may employ two or more heat sinks with independent mechanical isolation, allowing each component to be optimally cooled without mechanical stress transfer between elements. This recognizes that different components may have varying thermal expansion characteristics and mounting tolerances, which traditional rigid cooling solutions cannot adequately address.

Such a liquid cooling implementation utilizes shared inlet and outlet connections to a liquid coolant distribution unit, simplifying the overall system architecture while maintaining effective thermal management. Optionally, one or more flexible fluid connections between heat sinks provide mechanical accommodation for manufacturing tolerances and thermal expansion differences, ensuring reliable operation under varying thermal conditions.

The peripheral compute node is designed to operate within a distributed computing architecture where multiple nodes are communicatively coupled with a host compute node. This architecture enables the creation of large-scale computing meshes where individual peripheral nodes may perform specialized computational tasks while maintaining high-speed communication with both the central host and peer nodes.

The optical communication capability enables direct peer-to-peer communication between peripheral nodes, reducing the communication bottleneck that would otherwise occur if all inter-node communication had to route through the central host. This peer-to-peer capability is particularly valuable for applications requiring frequent data exchange between processing elements, such as distributed machine learning training or complex simulation workflows.

The architecture described herein, including the integration of electrical-to-optical conversion immediately adjacent to the accelerator module, using cooling assembly and pluggable components, provides several potential benefits that address the limitations identified in existing solutions.

Minimized Signal Degradation: By reducing the electrical path length between the accelerator and optical converter to optionally less than 50 millimeters in some embodiments, the invention substantially reduces insertion loss and signal integrity issues that plague longer electrical interconnects. This proximity enables higher data rates and more reliable communication between nodes. Enhanced Power Efficiency: The shortened electrical pathways require less power to drive signals, reducing overall system power consumption. Additionally, optical transmission over longer distances between nodes consumes significantly less power than equivalent electrical alternatives, contributing to overall system efficiency.

Improved Thermal Management: The integrated liquid cooling system addresses the combined thermal loads of both computational and optical components through a unified approach. This integration is more efficient than separate cooling systems and ensures that temperature-sensitive optical components operate within their optimal temperature ranges despite proximity to high-heat accelerator modules.

Mechanical Flexibility and Reliability: The mechanically isolated mounting approach accommodates manufacturing tolerances and thermal expansion differences between components. This flexibility reduces mechanical stress on sensitive optical components, improving system reliability and operational lifetime.

Scalable Architecture: The peripheral node architecture supports the creation of scalable distributed computing systems where additional computational capacity can be added through additional nodes without fundamental changes to the communication infrastructure. The peer-to-peer optical communication capability ensures that communication bandwidth scales with computational capacity.

Manufacturing and Integration Benefits: The pluggable optical transceiver module implementation with detachable mounting interfaces enables easier assembly, maintenance, and upgrade of optical communication capabilities. This modularity reduces manufacturing complexity and supports field serviceability of the optical components.

Embodiments of the present invention address operational challenges commonly encountered in high-performance computing environments. The direct optical connectivity between accelerator modules enables applications to take advantage of distributed processing without the communication bottlenecks typically associated with electrical interconnects. The thermal management system maintains stable operating conditions even under sustained high computational loads, enabling reliable operation in demanding computing environments. The mechanical accommodation of component tolerances reduces system failures related to thermal stress and mechanical misalignment, contributing to overall system reliability.

Optionally, a modular design approach enables system configurations to be optimized for specific computational workloads, with optical transceivers selected based on the communication requirements of particular applications. This flexibility supports a range of computing scenarios from tightly-coupled parallel processing to more loosely-coupled distributed computing architectures.

The peripheral compute node architecture may be designed to integrate effectively with existing host compute node infrastructure, such as supercomputers or other centralized computing systems. The host connectivity enables traditional computing workflows to take advantage of the distributed processing capabilities while maintaining compatibility with existing software and system management approaches. The optical networking capabilities enable the creation of computing clusters that can span larger physical distances than would be practical with electrical interconnects alone. This capability supports the development of computing infrastructures that can be distributed across data center facilities or even between facilities while maintaining high-performance communication links.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As used herein, the term "high-performance computing accelerator module" refers to a specialized processing unit designed for intensive computational tasks, including but not limited to high performance computing, artificial intelligence processing, machine learning workloads, scientific computing, and parallel processing applications. The accelerator module may be implemented as a system-on-chip, graphics processing unit, field-programmable gate array, application-specific integrated circuit, or other specialized processing element capable of delivering computational performance exceeding that of general-purpose central processing units.

As used herein, the term "electrical-to-optical converter" refers to a device or component that performs bidirectional signal conversion between electrical signals and optical signals. The converter includes optical transmission components that convert electrical signals to optical signals for transmission, and optical reception components that convert received optical signals back to electrical signals. The conversion enables high-speed optical communication between electronic processing elements. As used herein, the term "near-package optics interface" or "NPO interface" refers to an interface system that provides direct electrical connection between electronic processing elements and optical conversion components positioned in close physical proximity. The interface maintains signal integrity at high frequencies of 56G baud and above such as 112G baud and above optionally while enabling electrical trace lengths of less than 50 millimeters, between processing and optical conversion elements.

As used herein, the term "peripheral area" refers to a region on an electronic circuit substrate that is positioned around the perimeter or edge areas of the substrate, as distinguished from central areas where primary processing components may be located. The peripheral area provides mounting space for supporting components, interface circuits, and communication elements.

As used herein, the term "immediately adjacent" refers to a spatial positioning where components are located in close physical proximity to each other with minimal intervening space or components. In the context of this invention, immediately adjacent positioning optionally enables electrical trace lengths of less than 50 millimeters, between components while maintaining effective thermal and mechanical coupling. As used herein, the term "system-on-chip" refers to an integrated circuit that incorporates multiple processing elements, interface circuits, memory controllers, and other functional components within a single semiconductor package. The integration provides improved performance, reduced power consumption, and decreased component count compared to multi-chip implementations.

As used herein, the term "pluggable optical communication module" refers to a removable optical communication component that can be inserted into and removed from a socket structure without requiring permanent attachment methods such as soldering. The module includes both optical transmission and reception capabilities and provides detachable electrical and optical interfaces for field replacement and upgrade capability.

As used herein, the term "liquid cooling assembly" refers to a thermal management system that utilizes liquid coolant circulation to dissipate heat generated by electronic components. The assembly includes heat sink(s) with internal cooling passages, coolant distribution components, and fluid connections that transfer thermal energy from heat-generating components to a cooling medium.

As used herein, the term "mechanically isolated" refers to a mounting or coupling arrangement where components can move independently relative to each other to accommodate manufacturing tolerances, thermal expansion differences, and operational stresses without transferring mechanical forces that could cause damage or performance degradation. Mechanical isolation maintains effective thermal or electrical coupling while preventing harmful stress transfer.

As used herein, the term "flexible fluid connection" refers to a fluidic coupling between components that maintains liquid coolant flow while accommodating relative movement, position variations, and thermal expansion differences between connected elements. The flexible connection may be implemented through deformable tubing, bellows, or other structures that maintain fluid containment while permitting mechanical flexibility.

As used herein, the term "thermal coupling" refers to the establishment of an effective heat transfer pathway between a heat-generating component and a cooling element. Thermal coupling may be achieved through direct contact, thermal interface materials, or heat-conducting structures that facilitate the transfer of thermal energy from the component to the cooling system.

As used herein, the term "direct electrical connection" refers to an electrical pathway between components that minimizes signal degradation through reduced path length, controlled impedance design, and minimal intervening components or transitions. The connection maintains signal integrity at high frequencies of 56G baud and above while providing reliable electrical continuity between connected elements. As used herein, the term "intermediate conductive layer" refers to a conductive structure positioned between components on an electronic circuit substrate that provides electrical pathways and signal routing capability. The layer may comprise printed circuit traces, embedded conductors, or other conductive elements that facilitate electrical communication between components while maintaining controlled electrical characteristics.

Referring now to the drawings, FIG. 1 illustrates a peripheral compute node 100. The peripheral compute node 100 includes an electronic circuit substrate 200 that serves as the foundational mounting platform for the system components. A high-performance computing accelerator module 300 is mounted on the electronic circuit substrate 200. In this embodiment, the accelerator module 300 is implemented as a system-on-chip 310 that integrates multiple processing elements, memory controllers, and interface circuits within a single semiconductor package. The system-on-chip 310 may comprise specialized AI processing cores, high-bandwidth memory interfaces, and integrated network controllers optimized for machine learning workloads. The accelerator module 300 may be wired to be communicatively coupled with a host compute node (not shown) via electrical connections through the electronic circuit substrate 200.

An electrical-to-optical converter 400 (also referred to as E-O converter) is mechanically mounted on the electronic circuit substrate 200 immediately adjacent to the system-on-chip 310. The electrical-to-optical converter 400 is configured to convert electrical signals originated from the system-on-chip 310 to optical signals for transmission to the host compute node and optionally to other compute nodes such as a host computing device and/or other peripheral compute nodes. The converter 400 simultaneously converts optical signals received from another high-performance computing accelerator module of another peripheral compute node back to electrical signals for processing by the local system-on-chip 310.

The peripheral compute node 100 includes a near-package optics (NPO) interface 500 comprising an intermediate conductive layer 510 on the electronic circuit substrate 200. The intermediate conductive layer 510 provides direct electrical connection between the system-on-chip 310 and the electrical-to-optical converter 400. The intermediate conductive layer 510 comprises electrical traces 512 having a path length of optionally less than 50 millimeters, between the system-on-chip 310 and the electrical-to-optical converter 400.

The near-package optics interface provides direct electrical connection between the accelerator module and electrical-to-optical converter positioned in immediate proximity. This proximity minimizes electrical signal path lengths to enable reliable signal transmission at frequencies of 56G baud and above, where longer electrical traces would introduce unacceptable signal degradation. The interface maintains signal integrity through controlled impedance design and minimal intervening components while accommodating the extreme speed requirements of modern accelerator communication.

The electrical traces 512 may be implemented using controlled-impedance design with for example 50-ohm single-ended, 92-ohm or 100-ohm differential pair characteristics maintained through precise control of conductor width, thickness, and dielectric spacing. The traces 512 utilize high-frequency PCB materials with low loss tangent such as below 0.004 at 10 GHz, to minimize signal attenuation.

Optionally, a monolithic system-on-chip implementation is used for reducing component count and interconnection complexity compared to multi-chip solutions while providing a concentrated heat source that benefits from the adjacent optical converter positioning. The integrated design may enable tighter timing control between computational and communication functions, supporting applications requiring deterministic latency characteristics such as real-time AI inference or high-frequency trading algorithms.

Figure 2:
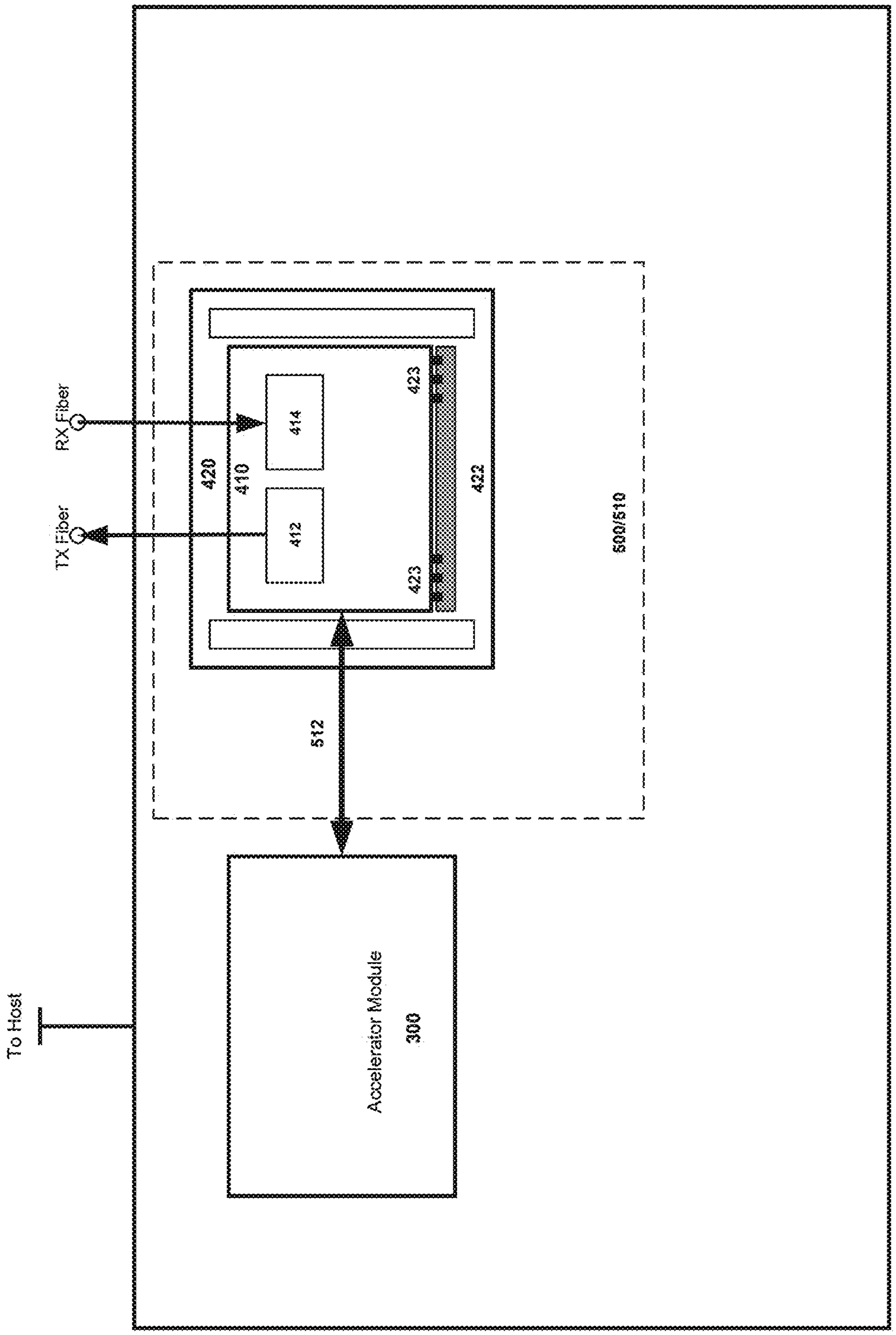
FIG. 2 is a schematic illustration of a peripheral compute node showing a pluggable optical communication module implementation with detachable mounting interface, according to some embodiments of the present invention.

Reference is also made to FIG. 2 which illustrates the peripheral compute node 100 but now featuring a pluggable optical communication module implementation, according to some embodiments of the present invention. The peripheral compute node 100 includes the same electronic circuit substrate 200 and high-performance computing accelerator module 300 as described in FIG. 1.

Figure 3A:
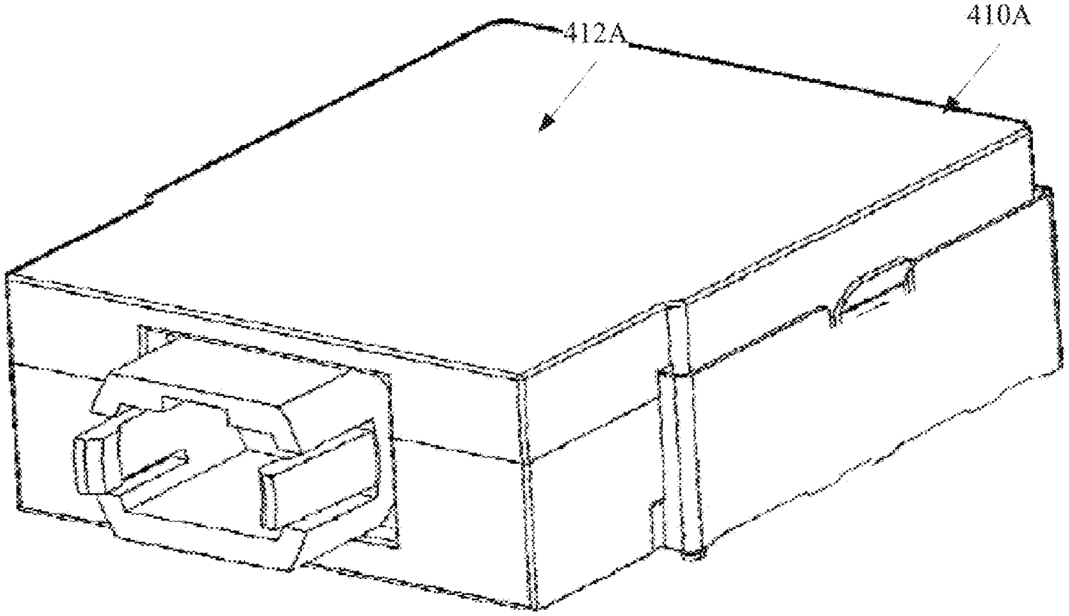
FIG. 3A is a schematic illustration of the exemplary pluggable optical communication module of FIG. 3A shown separately from the socket structure, according to some embodiments of the present invention.
Figure 3B:
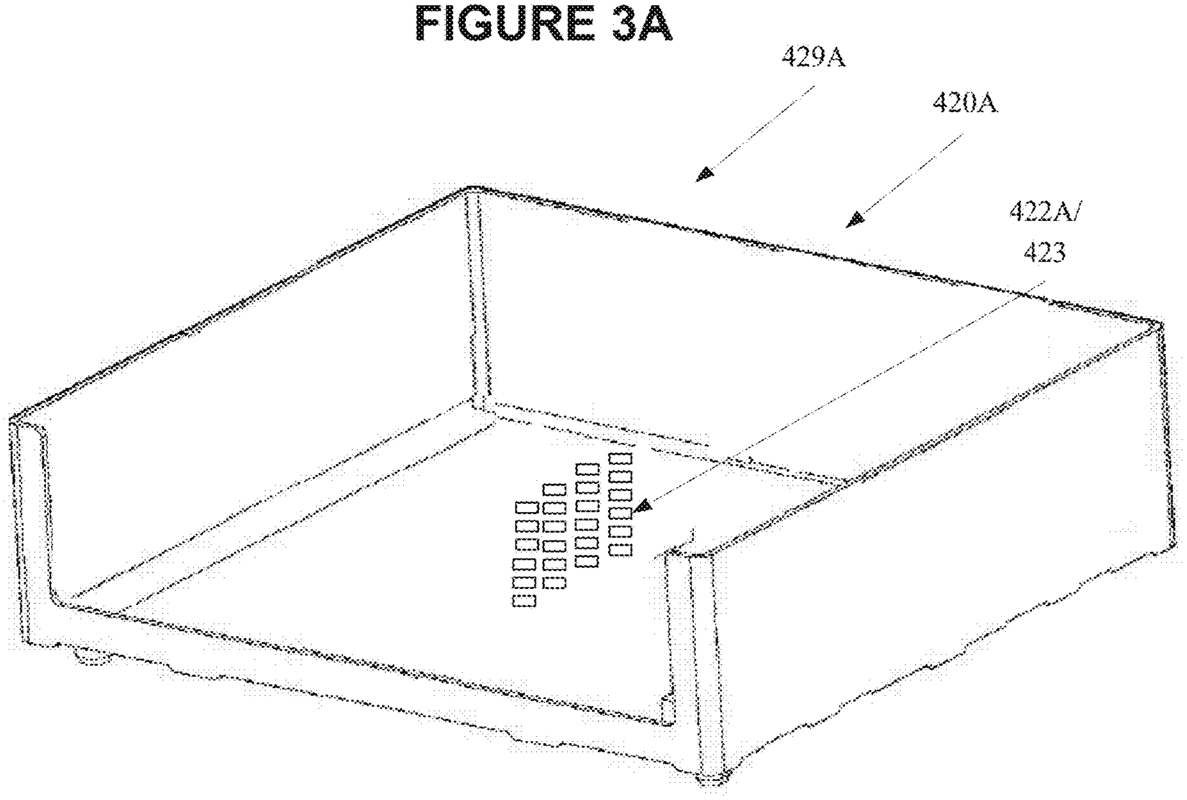
FIG. 3B is a schematic illustration of the exemplary socket structure of FIG. 3A shown separately from the pluggable optical communication module, according to some embodiments of the present invention.

In these embodiments, the electrical-to-optical converter 400 (which maybe one of multiple converters) comprises a pluggable optical communication module 410 having at least one optical transmission component 412 and/or at least one optical reception component 414. For example, the pluggable optical communication module is a receiver, transmitter or a transceiver. A socket structure 420 includes a detachable mounting interface 422 configured to receive and secure the optical transceiver module 410 in removable engagement with the electronic circuit substrate 200. For example, see also FIGS. 3A and 3B which are schematic illustration of an optional implementation of an exemplary pluggable optical communication module 410A and an exemplary socket structure 420A. FIG. 3A depicts the exemplary pluggable optical communication module 410A separately from in the exemplary socket structure 420A depicted in FIG. 3B depicts. The letter "A" is added to reference numerals for emphasizing that these elements are exemplary elements of the respective elements depicted without the letter "A".

Optionally, the electrical-to-optical converter 400 comprises a detachable optical module utilizing standard high-speed electrical connectors for mechanical and electrical attachment to the electronic circuit substrate 200. The detachable optical module may employ micro-coaxial connectors, high-speed board-to-board connectors, or custom hybrid electrical-optical connectors that provide both electrical signal pathways and mechanical retention without requiring specialized optical-specific mounting hardware. This configuration enables field replacement of optical components using standard electronic assembly equipment while maintaining the sub-50 millimeter electrical trace length requirement between the accelerator module 300 and optical conversion circuitry.

The optical transmission component 412/412A may comprise a semiconductor laser diode operating at wavelengths such as 850 nm for short-reach multimode applications or 1310 nm for longer-reach single-mode links. The laser diode may include driver circuits that convert electrical data signals into modulated optical output with rise times below 25 picoseconds for high-speed operation. The optical reception component 414 may comprise a photodiode or photodetector array configured to detect optical signals at corresponding wavelengths.

The socket structure 420/420A may include retention mechanisms such as latches 429A or thumb screws that secure the transceiver module 410 while enabling tool-free removal.

The detachable mounting interface 422/422A may include electrical contacts 423 configured to mate with corresponding contacts on the transceiver module 410, providing both power delivery and high-speed signal paths.

The pluggable optical communication module 410 may conform to industry-standard optical connector form factors such as MPO and MPT or other multi-fiber connectors such as MXC Connector and 3M™ Expanded Beam Optical (EBO) Connector.

supporting more than 100 Gbps aggregate data rates across several electrical lanes. Custom form factors may be implemented to optimize thermal and electrical performance for specific accelerator module interfaces.

The modular approach may allow optimization of optical components for specific link requirements. For example, a high-density computing cluster may utilize 400 Gbps transceivers with 8-lane electrical interfaces operating at 50 Gbps per lane, while a distributed computing application may employ lower-speed transceivers with extended reach capabilities spanning kilometers. The detachable interface 422 supports technology upgrades as optical transceiver standards evolve from current 400G implementations toward 800G and 1.6T specifications.

The near-package optics interface 500 may maintain the same intermediate conductive layer 510 and electrical trace 512 configuration as described in FIG. 1, providing direct electrical connection between the accelerator module 300 and the pluggable optical communication module 410 with path lengths below 50 millimeters.

Figure 4A:
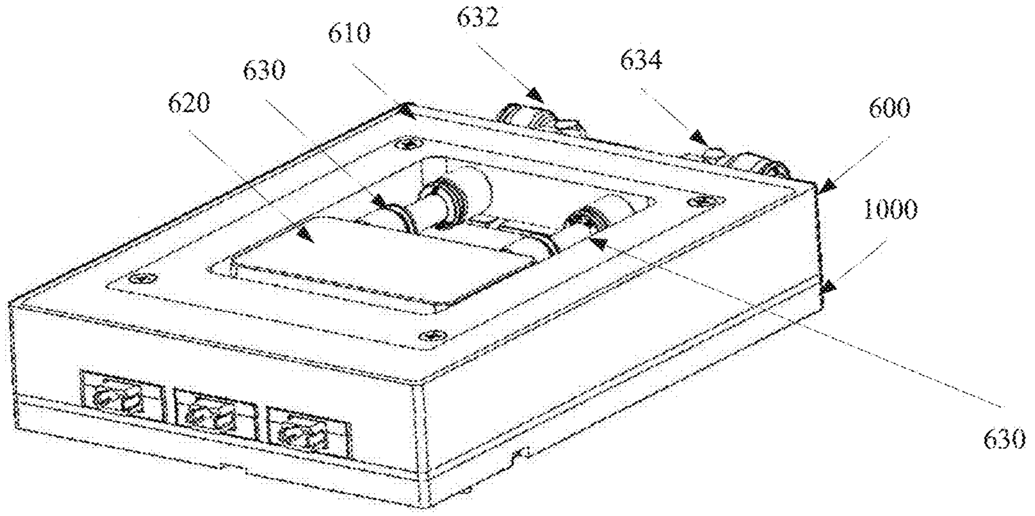
FIG. 4A is a schematic illustration of a peripheral compute node incorporating liquid cooling assembly configurations for thermal management of both the accelerator module and electrical-to-optical converter, according to some embodiments of the present invention.
Figure 4B:
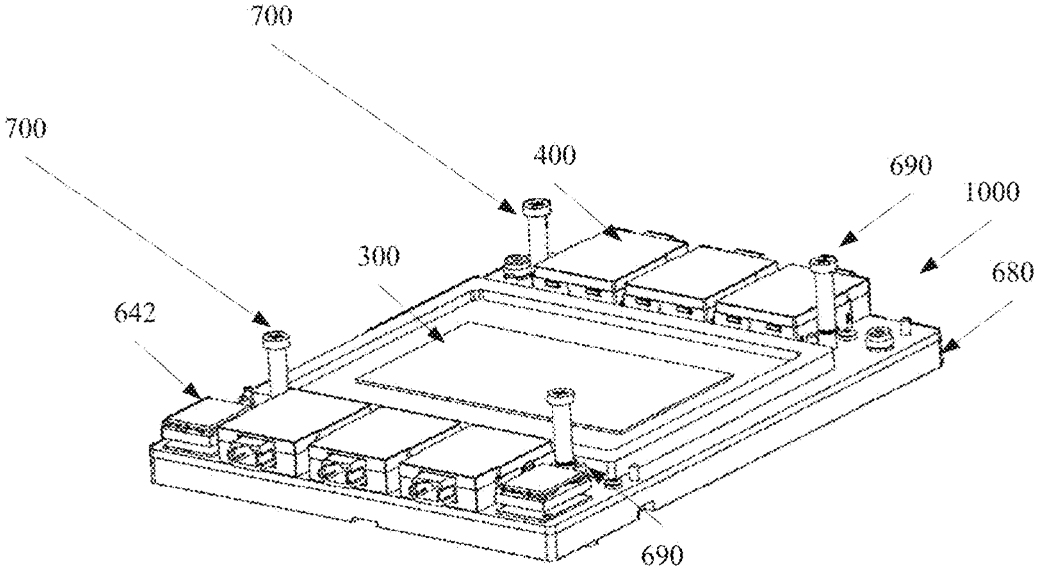
FIG. 4B is a schematic illustration of the peripheral compute node of FIG. 4A shown without the liquid cooling assembly, according to some embodiments of the present invention.

Reference is also made to FIGS. 4A-4E. FIG. 4A illustrates a peripheral compute node 1000, an exemplary implantation of the peripheral compute node 100, incorporating liquid cooling assembly 600 configurations for thermal management of both the accelerator module 300 and electrical-to-optical converter 400 which are also depicted in FIG. 4B, a schematic illustration of the peripheral compute node 1000 without the liquid cooling assembly 600.

The basic peripheral compute node elements from FIGS. 1 and 2 are present in the peripheral compute node 1000, with the addition of comprehensive thermal management systems. The liquid cooling assembly 600 may be as described in U.S. Ser. No. 19/058,176 filed on Feb. 20, 2025 and U.S. Ser. No. 19/216,235 filed on May 22, 2025 which are incorporated herein by reference.

In some embodiments, the liquid cooling assembly 600 comprises one or more heat sinks 620 thermally coupled to the accelerator module 300, one or more heat sinks 610 thermally coupled to the electrical-to-optical converter(s) 400, and one or more fluid connection(s) 630 which are optionally flexible fluid connection(s) 630 fluidically connecting between heat sink(s) 610 heat sink(s) 620 which may be referred to herein as the first and second heat sink(s) 610, 620.

Figure 4C:
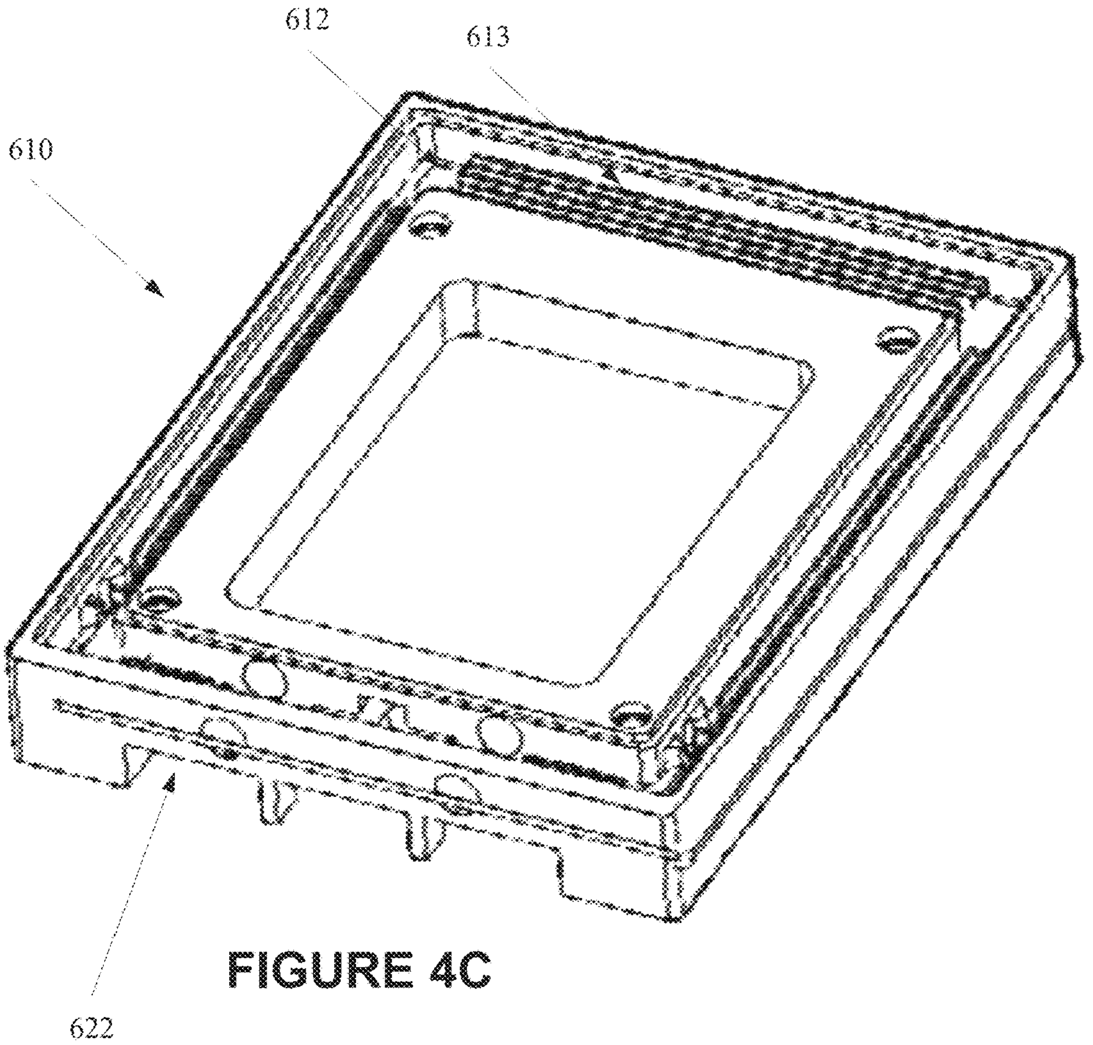
FIG. 4C is a schematic illustration of a first heat sink with inner cavity and channels for thermal management of the electrical-to-optical converter, according to some embodiments of the present invention.
Figure 4D:
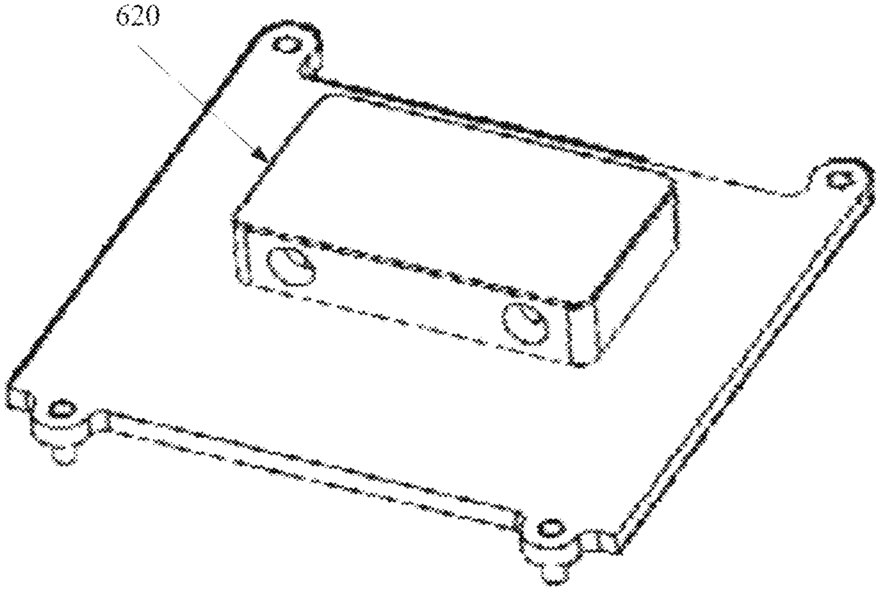
FIG. 4D is a schematic illustration of a second heat sink with inner cavity for thermal management of the accelerator module, according to some embodiments of the present invention.
Figure 4E:
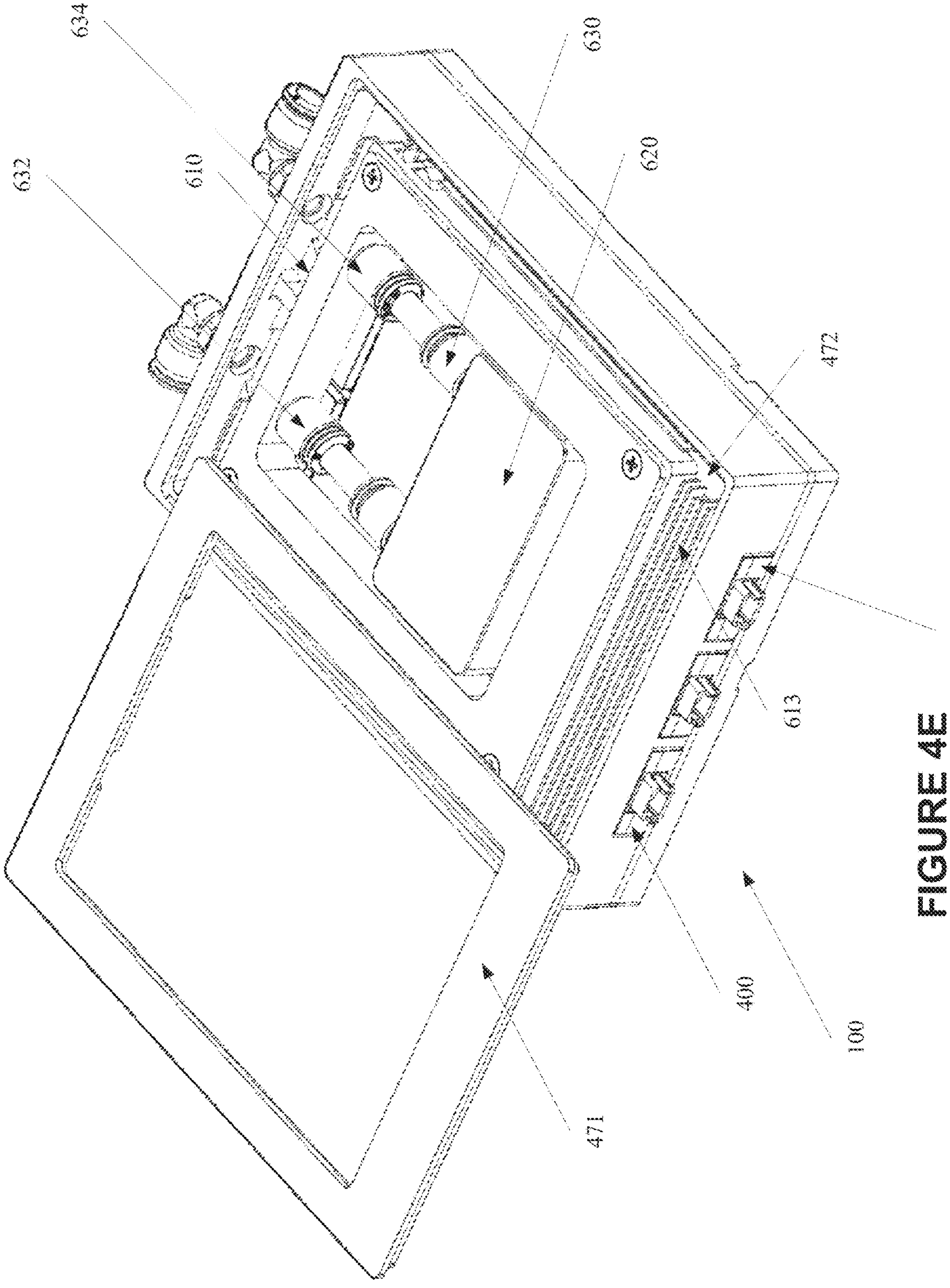
FIG. 4E is a schematic illustration of the second heat sink with inner cavity for thermal management of the electrical-to-optical converter where one of its walls is shifted to present the inner channels, according to some embodiments of the present invention.

As also shown in FIGS. 4C and 4D which are schematic illustrations of the first and second heat sink(s) 610, 620, which may be formed with inner cavities 612 and inner channels formed by separating walls positioned along a coolant flow direction as described in more details in U.S. Ser. No. 19/058,176 filed on Feb. 20, 2025 and U.S. Ser. No. 19/216,235 filed on May 22, 2025 which are incorporated herein by reference. In FIG. 4E, the heat sink 610 is depicted such that a detachable wall 471 thereof is shifted to the side, so as to allow presenting the inner channels 613. As shown at FIGS. 4C and 4E, niches such as 622 allows mounting the heat sink 610 such that the inner channels 613 are optionally thermally coupled to the surface of the electrical-to-optical converter(s) 400, facilitating heat transfer therefrom there along. The inner cavity 612 may be divided into sections connected by input and output channels that distribute liquid coolant flow substantially evenly between inner channels. The second heat sink 620 similarly includes an inner cavity (not shown) with flow distribution features optimized for the thermal characteristics of the accelerator module 300.

The fluid connection 630 is optionally a flexible fluid connection with flexible inlet tube(s) 632 and flexible outlet tube(s) 634 constructed from materials such as silicone or fluoropolymer compounds that maintain flexibility across operating temperature ranges of for example −20° C. to 105° C. The tubes optionally have internal diameters of 6-12 mm and include fittings that provide fluid-tight connections to the heat sink cavities.

The liquid cooling assembly 600 may mitigate thermal interference between the high-heat accelerator module 300 and temperature-sensitive optical components of the electrical-to-optical converter 400. Thermal isolation barriers 640 comprise low-thermal-conductivity materials such as ceramic insulators or polymer spacers with thermal conductivity below 1 W/mK positioned between heat-generating and heat-sensitive areas. Temperature sensors 642 monitor component temperatures and enable active thermal management through control algorithms that adjust coolant flow rates and distribution based on real-time thermal loads.

Optionally, the liquid cooling assembly 600 further comprises airlock prevention mechanisms wherein input and output channels of the heat sinks 610 and 620 are positioned adjacent to upper walls of their respective inner cavities. This configuration allows air bubbles entering the cooling system to pass through and exit the liquid cooling assembly without becoming trapped in upper sections of the cooling channels, thereby maintaining consistent coolant flow and thermal performance. The airlock prevention is particularly critical when cooling temperature-sensitive optical components that require stable thermal conditions for reliable signal quality.

Optionally, the liquid cooling assembly 600 is configured to split input liquid coolant flow between different circulation pathways in a predefined ratio optionally determined by (mathematical) relationships corresponding to expected power consumption ratios between the accelerator module 300 and electrical-to-optical converter 400 and/or other elements cooled by the second heat sink. The splitting mechanism comprises input channels optionally sized according to the predefined ratio, wherein channel cross-sectional areas are calculated based on thermal design power specifications of respective components. For example, if the accelerator module 300 consumes 600 W and the electrical-to-optical converter 400 consumes 150 W, the input channels may be sized in a 4:1 ratio to provide proportional coolant flow distribution without requiring active flow control valves.

The heat sinks maybe implemented as an integrated heat sink having two parts.

The first and second heat sink(s) 610, 620 (or an integrated heat sink that includes them both) is/are thermally coupled to both the accelerator module 300 and the electrical-to-optical converter 400. The heat sinks 610, 620 (or the integrated heat sink) comprises an inner cavity 652 fluidically connectable to a liquid coolant distribution unit and configured to form a liquid coolant circulation pathway for example as described in more details in U.S. Ser. No.

19/058,176 filed on Feb. 20, 2025 and U.S. Ser. No. 19/216,235 filed on May 22, 2025 which are incorporated herein by reference.

The heat sinks 610, 620 (or the integrated heat sink may have a frame-shaped structure, for example as depicted in FIG. 4E, sized corresponding to dimensions of the peripheral area of the electronic circuit substrate 200. A niche portion of the inner cavity, see for example 622, may be sized and shaped to encompass the electrical-to-optical converter 400, with the niche portion formed within an inner perimeter of the frame-shaped structure. Liquid coolant flows in proximity to the niche portion 622 to dissipate heat generated during optical transmission operations, for example see the optical channels depicted with reference to 613.

The heat sink 610 may include a contact surface positioned within the niche portion and configured to be thermally coupled to the electrical-to-optical converter 400. The contact surface may be precision-machined to match the electrical-to-optical converter 400 package contours to ensure effective thermal coupling. Multiple contact surfaces may be formed to accommodate different optical transceiver form factors while maintaining thermal coupling resistance for example below 0.1 K·cm$^2$/W. The inner channels 613 may comprise parallel flow passages with rectangular cross-sections of 3 mm×2 mm, arranged in patterns optimized through computational fluid dynamics analysis. Flow distribution is achieved through inlet manifolds 710 that divide incoming coolant flow among the parallel channels and outlet manifolds that recombine the flows. FIG. 4B further illustrates a base member 680 positioned adjacent to a bottom side of the electronic circuit substrate 200, along with mechanically isolated groups of tightening elements 690, 700 configured to independently press the heat sinks onto heat-dissipating areas of the accelerator module 300 and the electrical-to-optical converter 400.

The tightening elements are optionally resilient fastening elements such as spring-loaded screws configured to press the heat sink 620 onto the accelerator module 300 and to press the heat sink 610 onto the electrical-to-optical converter 400. Each spring-loaded screw may include a coiled spring with calibrated spring constant to apply predetermined compression forces, for example of 50-100N, for the accelerator module 300 and, for example of 20-40N, the electrical-to-optical converter 400. The mechanical isolation prevents stress transfer between components during thermal cycling, reducing reliability issues associated with differential thermal expansion coefficients while maintaining optimal thermal coupling for each component.

Optionally, the peripheral compute node 100 comprises a dual-sided thermal management configuration wherein electronic components are mounted on both the top and bottom sides of the electronic circuit substrate 200, and the liquid cooling assembly 600 provides thermal management for components on both sides through a unified cooling distribution system. The dual-sided configuration may include power delivery components mounted on the bottom side of the substrate 200 while the accelerator module 300 and electrical-to-optical converter 400 are mounted on the top side, with the cooling system managing combined thermal loads through mechanically isolated heat sink arrangements that accommodate differential thermal expansion between components on opposite sides of the substrate.

Optionally, the liquid cooling assembly 600 comprises communication channels extending through mounting openings or recesses in the electronic circuit substrate 200 to fluidically connect heat sinks positioned on opposite sides of the substrate. The communication channels may include coupling members such as nipple connectors with sealing elements such as O-rings that provide detachable fluid-tight connections enabling assembly and disassembly of the cooling system without coolant leakage. This configuration enables thermal management of components distributed across both sides of the substrate while maintaining a single coolant distribution connection point.

Figure 5:
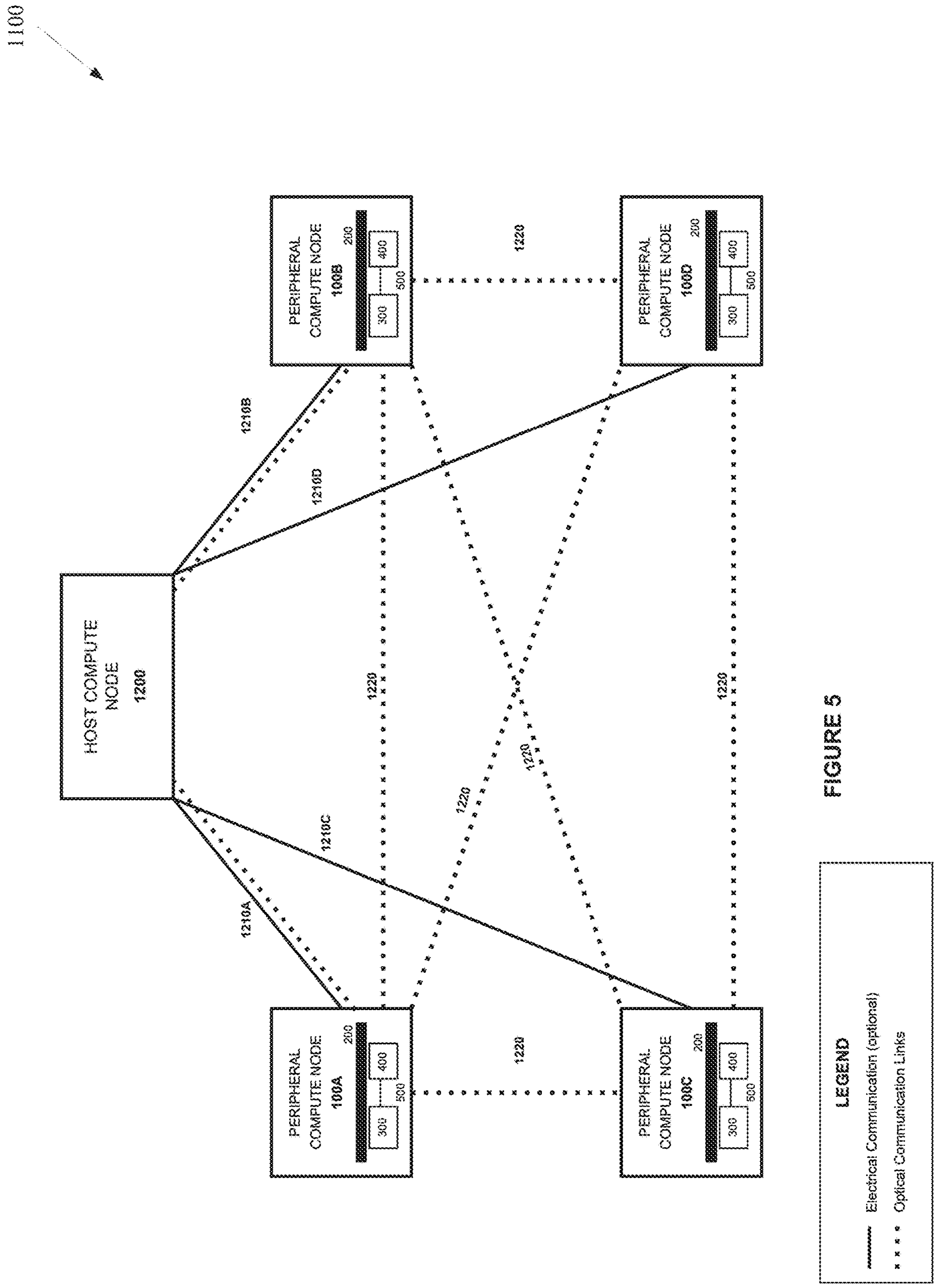
FIG. 5 is a schematic illustration of a multiprocessor compute cluster according to some embodiments of the present invention.

Reference is now also made to FIG. 5, which illustrates a multiprocessor compute cluster 1100 according to some embodiments of the present invention. The multiprocessor compute cluster 1100 comprises a host compute node 1200 and a plurality of peripheral compute nodes 100A, 100B, 100C, and 100D arranged in a distributed computing architecture.

Each peripheral compute node 100A-100D incorporates the structural and functional elements previously described with reference to FIGS. 1-4. Specifically, each peripheral compute node includes the electronic circuit substrate 200, high-performance computing accelerator module 300 mounted thereon, electrical-to-optical converter 400 positioned immediately adjacent to the accelerator module 300, and the near-package optics interface 500 comprising the intermediate conductive layer 510 providing direct electrical connection between the accelerator module 300 and electrical-to-optical converter 400.

The host compute node 1200 is communicatively coupled with each peripheral compute node 100A-100D through communication pathways 1210A, 1210B, 1210C, and 1210D respectively, which are optionally optical pathways or electronic pathways. When optical pathways are used, the host compute node 1200 may have one or more electrical-to-optical converters for converting received optical signals and transmitted electrical signals for the communication with any peripheral compute node, enabling direct optical signal transmission and reception with the peripheral nodes.

These communication pathways 1210A-1210D enable the host compute node 1200 to distribute computational tasks to the peripheral compute nodes 100A-100D and to receive aggregated results from the distributed processing operations.

Additionally, the multiprocessor compute cluster 1100 may optionally incorporate direct peer-to-peer optical communication links 1220 between the peripheral compute nodes 100A-100D themselves. The optical communication links 1210A-1210D, and optionally 1220, are established through the electrical-to-optical converters 400 of each peripheral compute node, enabling direct optical signal transmission and reception between peripheral nodes without requiring routing through the host compute node 1200. The optical communication links 1220 may comprise fiber optic cables or free-space optical transmission paths depending on the physical deployment configuration.

The optional peer-to-peer optical communication capability addresses communication bottlenecks that would otherwise occur in routes through the host compute node 1200. Each electrical-to-optical converter 400 performs bidirectional signal conversion, converting electrical signals originated from its associated accelerator module 300 to optical signals for transmission to the host compute node and optionally to other compute nodes such as a host computing device and/or other peripheral compute nodes, while simultaneously converting received optical signals from the host and/or from other peripheral nodes back to electrical signals for local processing.

The distributed architecture enables parallel computational task execution across the plurality of peripheral compute nodes 100A-100D while maintaining data coherency through both the host communication pathways and the optional direct optical communication links 1220. The high-performance computing accelerator modules 300 of each peripheral compute node operate on assigned portions of distributed computational workloads, with intermediate results optionally exchanged directly between nodes through the optical links 1220 or routed through the host compute node 1200. This flexible communication architecture eliminates potential latency and bandwidth limitations by providing both centralized coordination through the host and optional direct peer-to-peer data exchange capabilities.

The near-package optics interfaces 500 of each peripheral compute node maintain the electrical trace path lengths of for example less than 50 millimeters, between the accelerator modules 300 and electrical-to-optical converters 400, preserving signal integrity for high-frequency operation across the distributed system. The minimized electrical pathways reduce signal degradation and power consumption at each node while enabling aggregate data rates of 100 Gbps or higher such as 400 Gbps or higher across the optical communication links 1220.

The liquid cooling assemblies 600 described with reference to FIG. 4 may be implemented at each peripheral compute node 100A-100D to manage the thermal loads generated during intensive distributed computing operations. The thermal management capability enables sustained high-performance operation across the cluster 1100 without thermal throttling of the accelerator modules 300 or degradation of the temperature-sensitive optical components within the electrical-to-optical converters 400.

The multiprocessor compute cluster 1100 architecture provides computational scalability through the addition of peripheral compute nodes without requiring fundamental changes to the communication infrastructure. The optical communication links 1220 maintain communication bandwidth scaling proportional to computational capacity scaling, enabling efficient utilization of distributed processing resources across applications requiring intensive computational throughput such as artificial intelligence training, scientific simulation, and parallel numerical processing.

Optionally, the multiprocessor compute cluster 1100 comprises a distributed cooling network wherein multiple peripheral compute nodes 100A-100D share coolant distribution resources while maintaining individual thermal management for each node's accelerator module and electrical-to-optical converter combination. The distributed cooling network may include redundant cooling paths that provide fault tolerance, allowing continued operation of remaining nodes if cooling to one node is interrupted. The network topology enables scalable thermal management that grows proportionally with computational capacity additions.

Optionally, the optical communication links 1220 between peripheral compute nodes comprise embedded optical pathways within the electronic circuit substrates, reducing optical signal path lengths beyond the electrical-to-optical conversion point. The embedded pathways may include optical waveguides formed during PCB fabrication or dedicated optical channels that route optical signals directly between nodes without requiring external optical cabling. This configuration further minimizes signal loss and enables more compact system packaging while maintaining high-speed optical communication capabilities.

Figure 6:
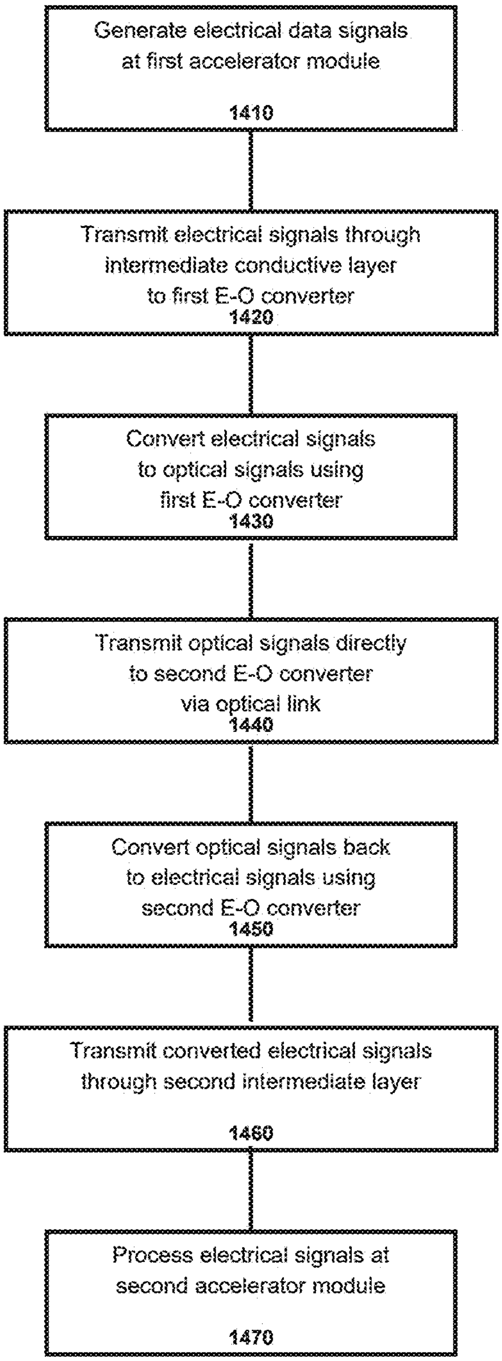
FIG. 6 illustrates a flowchart of a method of transmitting data between high-performance computing accelerator modules in a distributed computing system according to some embodiments of the present invention.

Reference is made to FIG. 6, which illustrates a flowchart of a method of transmitting data between high-performance computing accelerator modules in a distributed computing system according to some embodiments of the present invention. The flowchart depicts the sequential process steps with reference numerals for each operation occurring during data transmission between peripheral compute nodes, optionally utilizing the multiprocessor compute cluster 1100 architecture described with reference to FIG. 5 and the individual peripheral compute node components described with reference to FIGS. 1-4.

The process begins with step 1410, which represents the generation of electrical data signals at a first high-performance computing accelerator module for example 300 mounted on a first electronic circuit substrate for example 200 during computational processing operations. Step 1410 encompasses the intensive computational tasks performed by accelerator module 300A, such as matrix operations, neural network processing, or parallel numerical calculations, producing electrical data signals that represent computational results, intermediate processing states, or control information required by other nodes in the distributed computing system.

The flowchart proceeds to step 1420, representing the transmission of electrical data signals from the first accelerator module 300 through intermediate conductive layer 510A comprising electrical traces 512A to first electrical-to-optical converter 400A positioned immediately adjacent to the first accelerator module 300, for example within the peripheral area of the first electronic circuit substrate 200. Step 1420 maintains the electrical trace path length of optionally less than 50 millimeters as described with reference to FIG. 1, preserving signal integrity and minimizing insertion loss during electrical signal transmission.

Step 1430 represents the conversion of electrical data signals to optical data signals using first electrical-to-optical converter 400A through semiconductor laser diode modulation or other electro-optical conversion processes. The conversion process transforms electrical signal characteristics into optical signal characteristics suitable for transmission through optical communication media while maintaining the data content and timing relationships established by the originating accelerator module 300.

The flowchart continues to step 1440, depicting the transmission of optical data signals directly through optical communication link 1220 to second electrical-to-optical converter 400B optionally positioned immediately adjacent to second high-performance computing accelerator module 300B mounted on second electronic circuit substrate 200B and/or immediately adjacent to a host processor. Step 1440 represents optical transmission occurring without routing through host compute node 1200 described with reference to FIG. 5, enabling direct peer-to-peer communication between peripheral compute nodes and eliminating communication bottlenecks associated with centralized routing architectures.

Step 1450 represents the conversion of optical data signals back to electrical data signals using second electrical-to-optical converter 400B through photodetector operation or other opto-electrical conversion processes. The conversion process restores electrical signal characteristics required for processing by electronic accelerator modules while maintaining data integrity established during the optical transmission phase.

The flowchart proceeds to step 1460, representing the transmission of converted electrical data signals from second electrical-to-optical converter 400B through second intermediate conductive layer 510B comprising electrical traces 512B to second accelerator module 300B (and/or host processors(s)). Step 1460 maintains the same electrical trace path length constraints and signal integrity characteristics as step 1420, ensuring consistent electrical performance throughout the data transmission pathway.

Step 1470 represents the processing of electrical data signals at second accelerator module 300B or host processors(s) to continue distributed computational operations. The processing may involve incorporating received data into ongoing computational tasks, using the data as input parameters for subsequent calculations, or forwarding processed results to additional peripheral compute nodes through additional optical communication links 1220.

The process demonstrates a systematic approach for addressing signal degradation issues inherent in traditional electrical interconnect approaches by minimizing electrical pathway lengths at both transmitting and receiving nodes. The optical transmission medium provides immunity to electromagnetic interference and maintains signal quality over distances that would cause substantial degradation in equivalent electrical transmission systems. The direct peer-to-peer communication capability eliminates latency penalties associated with routing data through centralized processing elements.

The process enables distributed computational workloads to scale efficiently by providing high-bandwidth communication pathways between processing elements reducing communication bottlenecks at centralized switching or routing elements. The aggregate data transmission capacity scales proportionally with the number of peripheral compute nodes, supporting applications requiring intensive interprocessor communication such as distributed machine learning training, parallel scientific simulation, and large-scale numerical processing operations.

It is expected that during the life of a patent maturing from this application many relevant components will be developed and the scope of the term accelerator module and electrical-to-optical converter are intended to include all such new technologies a priori.

As used herein the term “about” refers to ±10%.

The terms “comprises”, “comprising”, “includes”, “including”, “having” and their conjugates mean “including but not limited to”.

The term “consisting of” means “including and limited to”.

The term “consisting essentially of” means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A peripheral compute node, comprising:

an electronic circuit substrate;

a high-performance computing accelerator module mounted on the electronic circuit substrate;

an electrical-to-optical converter packaged separately from the high-performance computing accelerator module and:

mechanically mounted on the electronic circuit substrate immediately adjacent to the high-performance computing accelerator module and outside a package of the high-performance computing accelerator module, and configured to convert electrical signals originated from the high-performance computing accelerator module to optical signals, and optical signals originated from at least one of a host compute node and another high-performance computing accelerator module of another peripheral compute node communicatively coupled with the host compute node to electrical signals; and a near-package optics (NPO) interface comprising an intermediate conductive layer on the electronic circuit substrate providing direct electrical connection between the high-performance computing accelerator module and the electrical-to-optical converter at a board level external to respective packages of the high-performance computing accelerator module and the electrical-to-optical converter, wherein the high-performance computing accelerator module and the electrical-to-optical converter do not share a common package substrate or interposer, and wherein the intermediate conductive layer comprises electrical traces routed on the electronic circuit substrate between a package of the high-performance computing accelerator module and a package of the electrical-to-optical converter.

2. The peripheral compute node of claim 1, wherein the high-performance computing accelerator module of the peripheral compute node comprises a system-on-chip.

3. The peripheral compute node of claim 1, wherein the electrical-to-optical converter comprises:

a-pluggable optical communication module having at least one of: at least one optical transmission component and at least one optical reception component; and a socket structure having a detachable mounting interface configured to receive the pluggable optical communication module in removable engagement with the electronic circuit substrate.

4. The peripheral compute node of claim 1, further comprising:

a liquid cooling assembly configured to dissipate heat generated by both the high-performance computing accelerator module and the electrical-to-optical converter during high-speed optical data transmission operations.

5. The peripheral compute node of claim 4, wherein the liquid cooling assembly comprises:

at least one first heat sink thermally coupled to the electrical-to-optical converter;

at least one second heat sink thermally coupled to the high-performance computing accelerator, module; and a flexible fluid connection fluidically connecting between the at least one first heat sink and the at least one second heat sink, wherein the flexible fluid connection thermally couples the at least one first heat sink and the at least one second heat sink to both the high-performance computing accelerator module and the electrical-to-optical converter during high-speed optical data transmission operations without applying damaging mechanical stress.

6. The peripheral compute node of claim 4, wherein the liquid cooling assembly comprises at least one heat sink thermally coupled to the electrical-to-optical converter, said at least one heat sink comprising:

an inner cavity fluidically connectable to a liquid coolant distribution unit and configured to form a liquid coolant circulation pathway; and wherein the inner cavity encompasses the electrical-to-optical converter such that liquid coolant flows in proximity to a surface thereof to dissipate heat generated by the electrical-to-optical converter during optical transmission operations.

7. The peripheral compute node of claim 5, further comprising tightening elements mounted to enable independent application of different thermal coupling pressures to the high-performance computing accelerator module and the electrical-to-optical converter without mechanical stress transfer therebetween.

8. The peripheral compute node of claim 5, wherein:

the at least one heat sink has a frame-shaped structure sized corresponding to dimensions of a peripheral area of the electronic circuit substrate; and the inner cavity is formed within an inner perimeter of the frame-shaped structure and positioned to provide thermal coupling with the electrical-to-optical converter.

9. The peripheral compute node of claim 5, further comprising:

a base member positioned adjacent to a bottom side of the electronic circuit substrate; and mechanically isolated groups of tightening elements configured to independently press the at least one heat sink onto heat-dissipating areas of the high-performance computing accelerator module and onto the electrical-to-optical converter.

10. The peripheral compute node of claim 5, further comprising a plurality of inner channels configured to distribute liquid coolant flow substantially evenly around the electrical-to-optical converter.

11. The peripheral compute node of claim 1, wherein the intermediate conductive layer comprises electrical traces having a path length of less than 50 millimeters between the high-performance computing accelerator module and the electrical-to-optical converter.

12. A multiprocessor compute cluster, comprising:

a host compute node; and a plurality of peripheral compute nodes, each peripheral compute node of the plurality of peripheral compute nodes comprising the peripheral compute node of claim 1, wherein each peripheral compute node of the plurality of peripheral compute nodes is communicatively coupled with the host compute node to enable distributed computing operations, and wherein communication between the plurality of peripheral compute nodes enables direct peer-to-peer data transmission without routing through the host compute node.

13. The multiprocessor compute cluster of claim 12, wherein the plurality of peripheral compute nodes are configured to execute parallel computational tasks while maintaining data coherency through optical communication links.

14. The peripheral compute node of claim 1, wherein both the high-performance computing accelerator module and the electrical-to-optical converter are implemented as detachable modules to enable independent field replacement of either component.

15. A multiprocessor compute cluster, comprising:

a host compute node; and a plurality of peripheral compute nodes communicatively coupled to the host compute node, each peripheral compute node of the plurality of peripheral compute nodes comprising:

an electronic circuit substrate;

a high-performance computing accelerator module mounted on the electronic circuit substrate and communicatively coupled with the host compute node;

an electrical-to-optical converter packaged separately from the high-performance computing accelerator module, mechanically mounted on the electronic circuit substrate immediately adjacent to the high-performance computing accelerator module and outside a package of the high-performance computing accelerator module, and configured to convert electrical signals from the high-performance computing accelerator module to optical signals for transmission to one or more other compute nodes and to convert optical signals from the one or more other compute nodes to electrical signals; and a near-package optics interface comprising an intermediate conductive layer on the electronic circuit substrate providing direct electrical connection between the high-performance computing accelerator module and the electrical-to-optical converter at a board level external to respective packages of the high-performance computing accelerator module and the electrical-to-optical converter, wherein the high-performance computing accelerator module and the electrical-to-optical converter do not share a common package substrate or interposer, and wherein the intermediate conductive layer comprises electrical traces routed on the electronic circuit substrate between a package of the high-performance computing accelerator module and a package of the electrical-to-optical converter;

wherein the plurality of peripheral compute nodes are configured for direct peer-to-peer optical communication to enable distributed computing operations without routing through the host compute node.

16. The multiprocessor compute cluster of claim 15, wherein the plurality of peripheral compute nodes are configured to execute parallel computational tasks while maintaining data coherency through optical communication links.

17. A method of transmitting data between high-performance computing accelerator modules in a distributed computing system, comprising:

generating electrical data signals at a first high-performance computing accelerator module mounted on a first electronic circuit substrate during computational processing operations, wherein the first high-performance computing accelerator module is packaged separately from a first electrical-to-optical converter that is mechanically mounted on the first electronic circuit substrate immediately adjacent to the first high-performance computing accelerator module and outside a package of the first high-performance computing accelerator module, and wherein a near-package optics interface comprising an intermediate conductive layer on the first electronic circuit substrate provides direct electrical connection between the first high-performance computing accelerator module and the first electrical-to-optical converter at a board level external to respective packages of the first high-performance computing accelerator module and the first electrical-to-optical converter, the first high-performance computing accelerator module and the first electrical-to-optical converter not sharing a common package substrate or interposer, and the intermediate conductive layer comprising electrical traces routed on the first electronic circuit substrate between a package of the first high-performance computing accelerator module and a package of the first electrical-to-optical converter;

transmitting the electrical data signals from the first high-performance computing accelerator module through the intermediate conductive layer having electrical traces with path lengths of less than 50 millimeters to the first electrical-to-optical converter;

converting the electrical data signals to optical data signals using the first electrical-to-optical converter;

transmitting the optical data signals directly to a second electrical-to-optical converter;

converting the optical data signals back to electrical data signals using the second electrical-to-optical converter;

transmitting the converted electrical data signals from the second electrical-to-optical converter through a second intermediate conductive layer to a second high-performance computing accelerator module; and processing the electrical data signals at the second high-performance computing accelerator module to continue distributed computational operations.

18. The method of claim 17, wherein the optical data signals are transmitted over optical communication links comprising fiber optic cables connecting between the first electrical-to-optical converter and the second electrical-to-optical converter.

19. The method of claim 17, further comprising operating a cooling assembly thermally coupled to at least one of the first high-performance computing accelerator module and the first electrical-to-optical converter based on thermal loads generated during the distributed computing operations.

* * * * *